W. G. MILLER.
INDICATOR FOR PRESSURE REGULATORS.
APPLICATION FILED APR. 21, 1917.
1,263,919.
Patented Apr. 23, 1918.
2 SHEETS—SHEET 1.
Fig. I
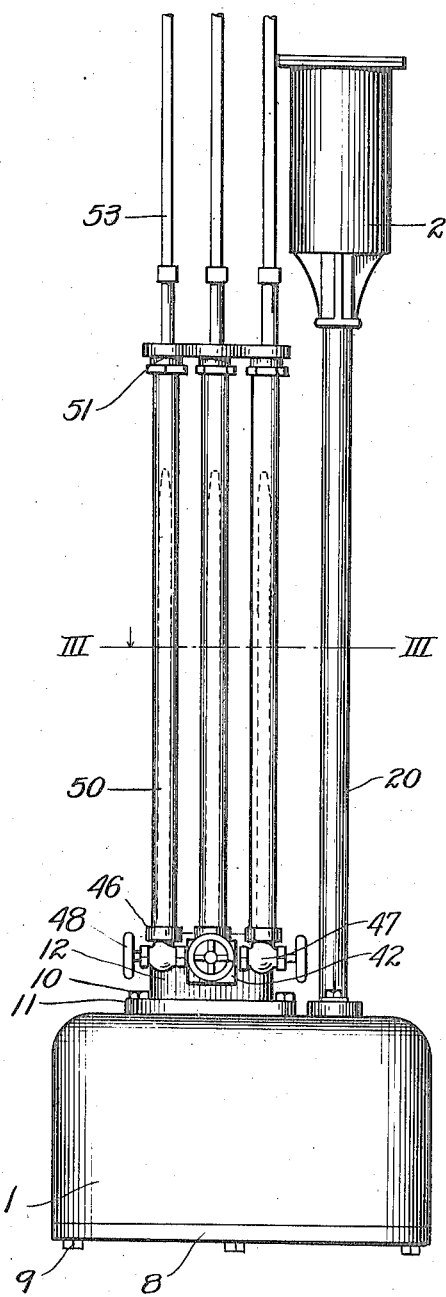
Fig. II
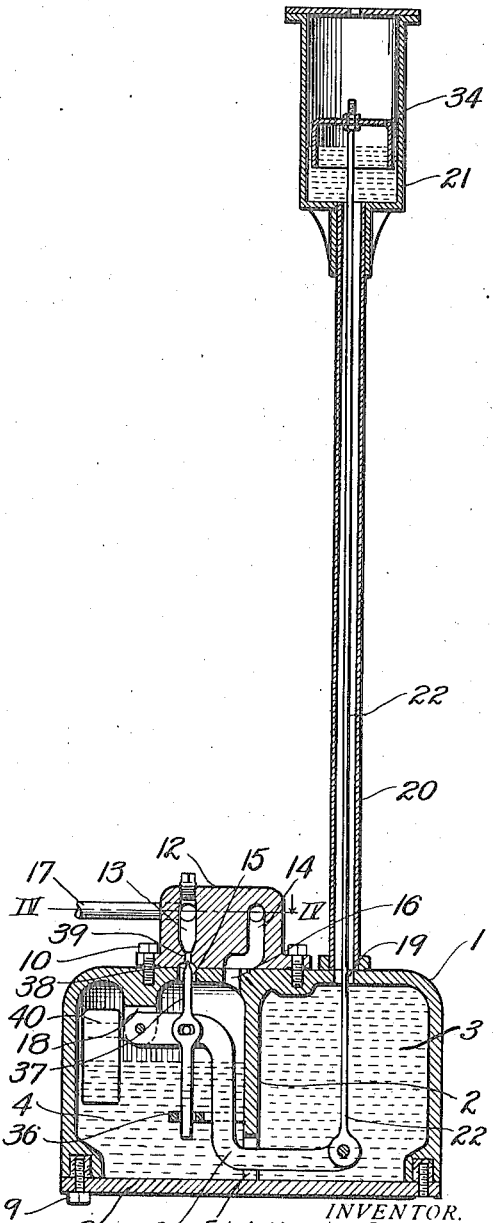
INVENTOR.
William G. Miller
BY
Arthur C. Brown
ATTORNEY W. G. MILLER.
INDICATOR FOR PRESSURE REGULATORS.
APPLICATION FILED APR. 21, 1917.
1,263,919.
Patented Apr. 23, 1918.
2 SHEETS—SHEET 2.
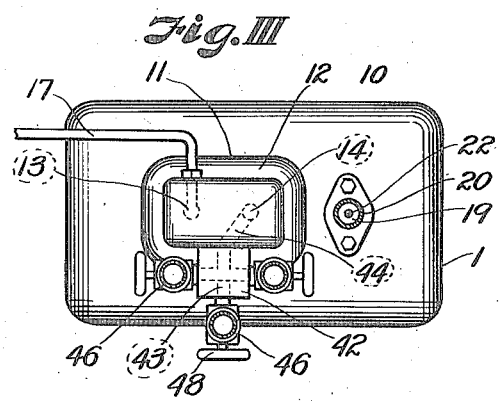
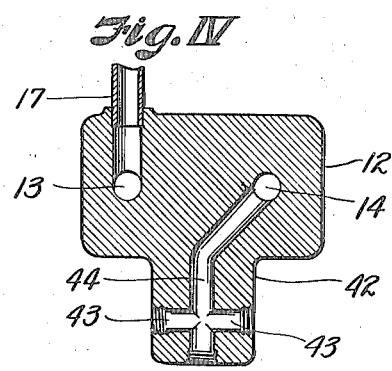
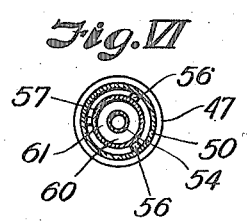
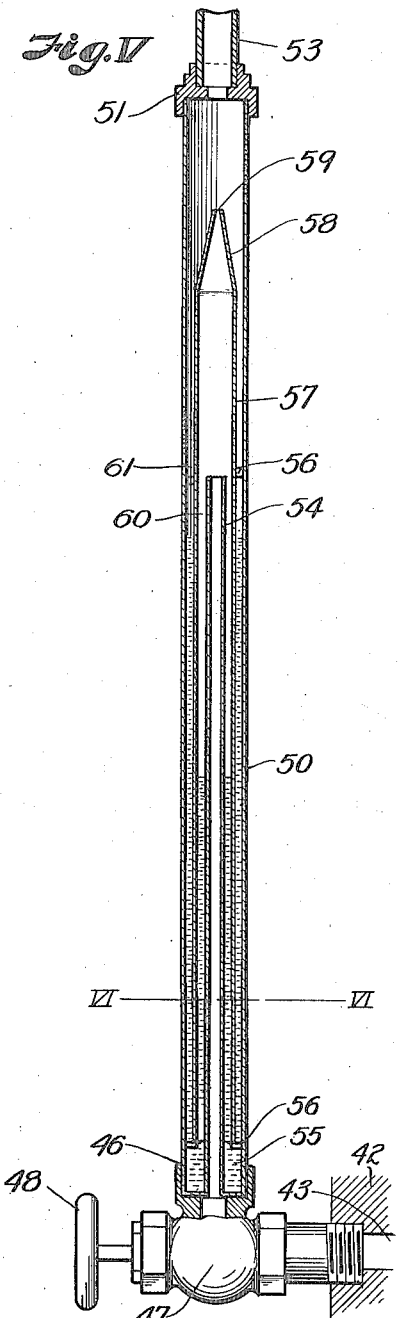
INVENTOR.
William G. Miller.
BY
Arthur C. Brown
ATTORNEY

UNITED STATES PATENT OFFICE.

WILLIAM G. MILLER, OF KANSAS CITY, MISSOURI.

INDICATOR FOR PRESSURE-REGULATORS.

1,263,919.   Specification of Letters Patent.   Patented Apr. 23, 1918.

Application filed April 21, 1917. Serial No. 163,702.

*To all whom it may concern:*

Be it known that I, WILLIAM G. MILLER, a citizen of the United States, residing at Kansas City, in the county of Jackson and State of Missouri, have invented certain new and useful Improvements in Indicators for Pressure-Regulators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an indicator for pressure regulators, and more particularly to devices of this character for use in gas lines for reducing and stabilizing a flow of gas from a source of supply under a high pressure to apparatus requiring a constant supply at a relatively low pressure; the principal object of the invention being to provide a device of this character for effecting such regulation of pressure together with gage apparatus whereby the flow of gas in volume and pressure may be accurately determined.

In accomplishing this object I have provided improved details of structure, the preferred forms of which are illustrated in the accompanying drawings, wherein:

Figure I is a side elevation of a pressure regulator and gage mechanism constructed according to the present invention.

Fig. II is a vertical section of the same.

Fig. III is a horizontal section on the line III—III, Fig. I.

Fig. IV is a horizontal section on the line IV—IV, Fig. II, illustrating the gas distributing channels from the supply chamber to the gages.

Fig. V is an enlarged vertical section of a gage unit.

Fig. VI is a cross-section on the line VI—VI, Fig. V.

Referring more in detail to the drawings:

1 designates a housing for containing the regulating mechanism which is preferably formed from a single casting, having an interior partition 2 dividing the housing into separate float, liquid and valve chambers 3—4 respectively, and having an opening 5 at its lower edge through which fluid may flow from one chamber to another and within which a float controlled valve beam 6 may operate.

The housing 1 is open at the bottom, but, when the device is assembled, is closed by a base plate 8 which is attached to the body of the housing by bolts 9; the joint between the housing and plate being sealed to prevent leakage, by any suitable packing (not shown).

Mounted on the top of the housing 1, and attached thereto by means of cap screws 10, extended through an integrally formed flange 11, is a head 12 provided with inlet and outlet channels 13—14 which communicate with the housing chamber 4 through registering openings 15—16 in the upper wall of the housing, so that gas may be delivered into the housing through the channel 13 and opening 15, and delivered therefrom through the opening 16 and channel 14; the channel 13 being threaded at its outer end to receive the end of the supply conduit 17 which may lead from the gas supply.

Pivotally mounted within the chamber 4 between ears 18 depending from the top wall of the housing, is the valve beam 6, the same being turned downwardly in the valve chamber and extended through the opening 5 in the partition 2 so that its free end is located within the float chamber 3 and directly below an opening 19 in the top of the housing.

Mounted vertically on the housing and inclosing the opening 19 is a stand pipe 20 which carries and opens at its upper end into a float chamber 21; the pipe 20 being of such length that, when it is filled with liquid, sufficient head pressure will be provided to maintain a given pressure in the chamber 4. Pivotally attached to the free end of the beam 6 and extending upwardly through the housing, opening 19, pipe 20, and into the float chamber 21, is a connecting rod 22, which is threaded at its upper end to adjustably carry a float 34 which moves according to the rise and fall of liquid within the float chamber to actuate the beam 6.

Pivotally mounted on the beam 6, within the valve chamber 4, and having its lower end slidably contained in a guide bracket 36 is a stem 37, the upper end of which projects through the housing opening 15 and into the inlet channel 13 of the head 12; the stem being provided with a needle point 38 adapted for coöperation with a contracted neck 39 in the channel 13 to close or regulate the channel opening according to the position of the beam 6 as governed by the float 34; the beam and float being counter-balanced by a weight 40 mounted on the end of the beam within the valve chamber. To deliver gas from the regulator to the various points of distribution I provide the head 12 at one side with a laterally extending neck 42 having a plurality of exteriorly opening channels 43 therein which lead from a common channel 44 continuing from the outlet channel 14, whereby communication is established with its supply chamber 4.

To regulate and determine the gas pressure and the volume flowing to each of the points of distribution I provide vertically arranged gages 46, which communicate with the distributing channels 43 through valved fittings 47 threaded into the said channels and which contain valves that may be actuated to close or open passages therethrough by the actuation of hand wheels 48.

Each of the gages 46 is made up of coaxially arranged tubes of glass or other transparent material and comprises an exterior tube 50 which seats at its upper end in a fitting 51 through which connection is made with a distributing conduit 53 which delivers the gas to its place of use.

Located within the tube 50 is a tube 54, which is of lesser length and relatively smaller diameter than the exterior tube 50 and communicates directly through the valve 47 with the outlet channel 43; the base ends of the tubes 50 and 54 being drawn together to form a closed annular channel 55 for containing a pressure indicating fluid, as hereinafter described.

Supported within the annular channel 55 by means of studs 56, projecting inwardly from opposite walls of the exterior tube 50, is a tube 57, the upper end of which is provided with a contracted neck 58 forming a restricted outlet orifice 59 through which gas delivered into the gage is required to pass before entering the distributing conduit 51.

Assuming that the parts are so constructed, in assembling the device, the beam 6 with the valve stem 37 and weight 40 attached thereto is located within the housing and pivotally mounted between the ears 18, with the lower portion of the beam located within the partition opening 5, the stem 37 seated in the inlet opening 15 and the free end of the beam 6 connected with the float rod 22. The base plate 8 is then applied to the housing and the housing filled with liquid to the required depth.

The head 12 is then attached to the housing with the channels 13 and 14 registering with the openings 15 and 16 and the intake conduit 17 properly attached to the head and with a connected suitable source of gas supply. The valves 47 are then inserted in the channels 43 and the gage tubes 46 inserted in the valves and attached to the distributing conduits 51.

Before the gages are inserted in the valves 47, the channels 60 and 61 which together make up the channels 55, are filled with suitable liquid to a level slightly below the upper ends of the tubes 54, i. e., to about the center of the gages. With the gages in place, gas under high pressure is then admitted to the intake channel 13 and passes through the open valve opening 39 and into the chamber 4, and is fed through the outlet channel 14 to the outlet channel 44 and is distributed through the channels 43 and valves 47 to the gage tubes 46 and ultimately to the distributing conduits 53.

As the incoming gas is under a higher pressure than is desired for use in the apparatus at the terminals of the distributing conduits 53, it will force the liquid in the chamber 4 through the channel 5 into the chamber 3 and upwardly through the pipe 20 into the chamber 21, to effect the lifting of the float so that the beam 6 is lifted to actuate the valve stem 37 against the seat 39 to close the inlet channel 13; it being apparent that as the pressure in the valve chamber increases with the increase in supply, the float is proportionately lifted and the supply shut off.

As the gas escapes through the outlets 16 and 14 for use, pressure in the valve chamber 4 becomes less and the head of liquid in the chamber 3, standpipe 20, and float chamber 21 induces a flow back into the valve chamber, thereby permitting the float 34 to fall. Falling of the float actuates the valve 37 to open the channel 13 and thereby permits intake of more gas. In this way a constant supply of gas under a substantially constant pressure, materially less than that at the original supply source is maintained in the chamber 4, the pressure at which the supply in the valve chamber is maintained being dependent on the head of liquid in the stand pipe and fluid chamber, by which the float is controlled.

The gas delivered into the outlet channel 16 is passed into the head channel 44 and to the various outlet channels 43 and may be admitted to the gage 46, as desired, by adjustment of the valves 47, so that not only is the flow of gas automatically controlled by the float 34 acting through the valve rod 37 but is also manually controlled and may be regulated by the valves 47.

Gas entering the gages through the tubes 54 is delivered into the upper end of the tube 57 and escapes through the orifice 59 to the distributing conduit 53, but as the orifice is of very small area and the intake tube relatively large, a back pressure in the tube 57 is created which forces the liquid therein downwardly within the tube 57 and upwardly about the exterior thereof; the difference in level in the chambers 60 and 61 making it possible for an observer to determine the pressure at which gases are escaping through orifice 59. As the area of the discharge orifice 59 is known and the pressure thus established the flow of gas in volume may be easily calculated.

It is apparent that with apparatus of this character the needle valve controlling flow to the valve chamber of the regulator will admit a limited flow through the valve seat and that the flow is determined by the position of the valve stem and position of the float 34.

It is also apparent that the gages permit the operator to ascertain at all times the volume of gas being delivered to the individual using apparatus, and that one regulator may be made to serve a plurality of distributing conduits by providing the neck 42 with a like number of discharge outlets.

Having thus described my invention, what I claim as new therein, and desire to secure by Letters-Patent, is:—

1. The combination with pressure regulator mechanism of the character described, comprising a gas discharge conduit, of a pressure indicator interposed in said conduit and forming a part thereof and comprising a vertical exterior tube, a concentrically arranged gas inlet tube projecting into the outer tube from its lower end to form an annular channel closed at its lower end to contain a pressure indicating liquid, a tube having a restricted orifice at its upper end located within the annular channel and terminating at a point adjacent the base of the channel to inclose the intake tube and thereby dividing the annular channel into inner and outer chambers, and means for admitting gas through the inlet tube whereby varying pressure of fluid delivered to the indicator may effect variation of the levels of liquid in said chambers, for the purpose set forth.

2. The combination with automatically operable pressure regulator mechanism of the character described, having a gas discharge conduit leading therefrom, of a pressure indicator interposed in said conduit and having a discharge passage of known area; said indicator comprising separate chambers intercommunicating at their lower ends and partially filled with a pressure indicating liquid, and a manually controlled valve for admitting a flow of gas through the indicator as needed to produce variation in the levels of liquid in said chambers.

3. A pressure indicator comprising tubes arranged vertically to form an interior chamber, having a discharge orifice of known area at its upper end, and an exterior chamber opening at its upper end into a distributing conduit; said chambers being intercommunicating at their lower ends and partially filled with a pressure indicating liquid, and means for delivering gas into the interior chamber to produce a certain variation of levels of the liquid in said chambers, for the purpose set forth.

4. The combination with automatically operable pressure regulating mechanism for delivering a flow of gas from a supply under high pressure to a using apparatus at a relatively low pressure and having a gas distributing conduit leading therefrom, of a pressure indicator interposed in said conduit and forming a part thereof, said indicator comprising transparent tubes arranged vertically and concentrically to form separate chambers intercommunicating at their lower ends and partially filled with a pressure indicating liquid, the interior chamber having a contracted discharge orifice at its upper end of known area and opening into the exterior chamber, the latter opening into the distributing conduit through a relatively large opening, and a manually controlled valve in the conduit for admitting a flow of gas to the interior chamber to effect by pressure therein a certain variation of levels of liquid in the interior and exterior chambers whereby the flow of gas in volume may be determined.

5. The combination with a gas distributing conduit, of a pressure indicator interposed in the conduit as a part thereof; said indicator comprising a vertical, transparent exterior tube, an interior tube extended concentrically therein and terminating below the upper end of the exterior tube to form an annular channel for containing a pressure indicating liquid, a transparent tube inserted within the annular chamber inclosing the inner tube to a point adjacent its lower end and dividing the annular channel into interior and exterior chambers, the intermediate tube having a contracted upper end forming a discharge orifice of known area and relatively smaller than the distributing conduit, and a manually operable valve located in the conduit for controlling a flow of gas into the indicator through the interior tube to effect a downward movement of the level of the liquid in the interior chamber and a relative upward movement in the exterior chamber incidental to and in proportion to the pressure created therein, whereby the pressure and flow of gas in volume through the conduit may be determined.

In testimony whereof I affix my signature.

WILLIAM G. MILLER.